Patented Nov. 2, 1948

2,452,970

UNITED STATES PATENT OFFICE 2,452,970

TREATMENT OF WATER

George P. Vincent, Briarcliff Manor, and James Douglas MacMahon, Niagara Falls, N. Y., and John F. Synan, Fall River, Mass., assignors to Mathieson Chemical Corporation, a corporation of Virginia No Drawing. Application January 22, 1945, Serial No. 574,028

9 Claims. (Cl. 210—28)

This invention relates to improvements in the treating of water and more particularly to the elimination of undesirable tastes and odors, especially mal-tastes and odors remaining in the water after a chlorine treatment or developed or accentuated as a result of a chlorine treatment of the water.

Many cities and towns depend upon river, lake or other surface water for their water supply. Practically all such water had to be treated in various ways in order to make it safe or acceptable for human consumption. Ordinarily, water of this type is clarified, filtered and disinfected. The usual method of disinfecting the water to free it from bacterial pollution, or to reduce bacterial content to a safe range, prescribed by State or municipal health departments, involves subjecting the water to a chlorine treatment.

Many water supplies are contaminated by industrial wastes containing phenols and related compounds, waste liquors from paper making operations, vegetation such as algae or decayed vegetable matter, sewage effluents and the like. Frequently, the presence of such contaminants in the water supply results in disagreeable tastes or odors which are not ordinarily removed by chlorination but which in fact are often developed or accentuated by the conventional chlorine treatment and makes the water unsatisfactory for drinking or cooking purposes even though bacteriologically safe.

Many methods have been developed and are being used in attempts to correct this objection but none of these has been found completely satisfactory due either to lack of effectiveness, excessive cost, the inability to maintain adequate control or other difficulties.

A common cause of mal-tastes and odors of water is the presence in the water supply of phenols or related compounds. When such compounds are present in the water supply, even in extremely low concentrations insufficient to render the water objectionable, the chlorination of the water to render it bacteriologically safe has been found to result in an extremely objectionable taste and odor, apparently due to a reaction of the chlorine with the phenol or phenolic contaminants resulting in the formation of chlorphenolic or like compounds with a characteristic, so-called chlorphenolic taste and odor.

This result of chlorine treatment of certain waters has long been recognized in the art of water treating, but no satisfactory method has been developed for overcoming the disagreeable consequence.

It has heretofore been proposed to alleviate the objectionable results of the chlorine treatment of such water by materially increasing the amount of chlorine used. For instance, there has been developed a method for treating water supplies known as "break-point chlorination." By this method improved results have been obtained in some instances but frequently only at substantial economic sacrifice. Further this method has not always been found to be effective or dependable. One objection to the break-point method is due to the fact that the concentration of contaminants in the water is subject to considerable variation, seasonal and otherwise. Consequently, the amount of chlorine required, in excess of that required to effect satisfactory disinfecting has been subjected to wide variation where the break-point method has been used, and control has been difficult.

The phenomena which occur when water is chlorinated are curious and not completely understood. At first, the chlorine is consumed, perhaps in the destruction of bacteria or the like. The amount of chlorine thus consumed will vary with different water and is known as the "chlorine demand." As the chlorine dosage is increased beyond the demand of the particular water being treated, there develops in the water, a chlorine residual. As the chlorine dosage is still further increased, say from 1 part per million to 5 parts per million, the chlorine residual may increase, but as the chlorine dosage is further increased, a maximum chlorine residual is sometimes reached and, as the chlorine dosage is increased beyond that which results in the maximum chlorine residual, there may occur a decrease in chlorine residual, sometimes the chlorine residual disappearing completely. Thereafter, as the chlorine dosage is further increased there usually occurs a rise in chlorine residual, usually in almost direct proportion to the increase in chlorine dosage. The point where this further rise occurs in the super-chlorination of water is designated "break-point." The point varies with different waters and if chlorine residual be plotted against chlorine dosage, it will be found that there is considerable variation in the shape of the resultant curve for different waters.

Where this method is used, it is sometimes found that the mal-taste and odor of the water and, particularly water containing phenolic contaminants, disappears at the break-point but with a lesser chlorine dosage the mal-taste and odor is accentuated.

To improve or eliminate mal-tastes and odors in water by the break-point method, may require use of an amount of chlorine within a range of 5 to 140 parts per million and frequently it is necessary to dechlorinate the water after such treatment to reduce its chlorine content to within tolerable limits. The use of such heavy dosage of chlorine and the subsequent dechlorination of the water have been found expensive and not always effective in eliminating mal-tastes and odors.

We have discovered that the difficulties heretofore experienced may be avoided and that improved results may be obtained more consistently and more economically by first disinfecting the water by a treatment with chlorine, for instance a conventional chlorine treatment, and thereafter treating the water with chlorine dioxide.

The treatment of water with chlorine dioxide has previously been suggested as a substitute for a chlorine treatment for the destruction of bacteria. Further, it has previously been observed that the treatment of water containing phenolic compounds with chlorine dioxide does not develop or accentuate mal-taste and odor of the water. However, it has not previously been known that mal-tastes and odors present in the water, or developed or accentuated in the water by chlorine treatment, could be eliminated by treatment with chlorine dioxide.

We have observed a definite tendency toward a more permanent removal of mal-tastes and odors when the contaminated water is treated in accordance with our present invention. This has been particularly noticeable where the chlorine dioxide is applied as a post-treatment and more particularly when the water is contaminated with phenolic tastes and odors. Although "break-point" chlorination may sometimes remove similar tastes, there is a tendency for them to revert on long standing, particularly when the residual chlorine has become discharged from the water.

In accordance with our present invention the water is first dosed with an amount of chlorine sufficient substantially to disinfect the water and thereafter the chlorinated water is subjected to the action of chlorine dioxide. The invention is applicable both to the pretreatment or post-treatment of the water, i. e., prior to or subsequent to the filtration of the water, respectively. Also, the water may be given a pretreatment with the chlorine and a post-treatment with chlorine dioxide. By this sequence of operations, the water may be made bacteriologically safe for consumption by the preliminary chlorine treatment and the mal-tastes and odors present in the water, or developed or accentuated as a consequence of the chlorine treatment, are thereafter eliminated by treatment with chlorine dioxide.

In accordance with a particularly advantageous method of operation, the water is disinfected by a conventional chlorine treatment, prior to filtration, using a chlorine dosage such as will result in a chlorine residual of say about 0.1 to about 0.3 part per million after the water has passed through the filter, and thereafter the water is subjected to the action of the chlorine dioxide. The optimum dosage of chlorine dioxide will vary considerably, depending primarily upon the water condition. Satisfactory results are normally obtained using a dosage of chlorine dioxide within the range of about 0.25 to about 1.5 parts per million parts of water. Generally, about 0.1 to 10 parts of chlorine dioxide per million parts of water will substantially eliminate, under even the most adverse conditions, the mal-tastes and odors of water due to the presence of derivatives of phenol or related compounds, nitrogenous compounds, for instance such as present in sewage, paper mill wastes or vegetable material, for instance algae or decayed vegetation.

A dosage of chlorine dioxide within the range of 0.4 to 0.5 part per million parts of water has been found sufficient for the elimination of mal-tastes and odors due to the presence of derivatives of phenol or related compounds in all but the most drastic conditions. Even under such more drastic conditions the residual taste and odor is so slight as to be hardly objectionable and usually is entirely removed by a small increase in the chlorine dioxide dosage.

It will be understood that all reference herein and in the accompanying claims to the amounts or proportions of chlorine or chlorine dioxide used or contained in the water is expressed in terms of the weight of available chlorine. Elemental chlorine, for instance liquid or gaseous chlorine, is, of course, 100% available chlorine. The available chlorine equivalent of chlorine dioxide is 263%.

In accordance with our present invention, chlorine dioxide, as such, may be introduced into the water being treated, or it may be generated in a relatively small portion of water, by known means, for instance by reacting a water-soluble chlorite, for instance sodium or calcium chlorite, with chlorine or with an acid. Accordingly, the expression "contacting the water with chlorine dioxide," appearing in the claims, must be understood to include the introduction of chlorine dioxide as such into the water as well as the generation or development of chlorine dioxide in the water. An advantageous method of treating the water with chlorine dioxide is to react chlorine and a chlorite in a relatively small flow of water and feed the water containing the generated chlorine dioxide into the main water flow. For example, chlorine gas and an aqueous solution of the chlorite may, with advantage, be separately injected at a metered rate into the small flow of water. The two are therein permitted to react to generate chlorine dioxide and the water containing the generated chlorine dioxide is admixed with the main flow of the water being treated. Where chlorine is used for this purpose, an excess over that theoretically required to react with the chlorite may, with advantage, be used so as to induce quick and complete decomposition of the chlorite. The theoretical requirement is one mol of chlorine for each two mols of $ClO_2$ liberated, but it is usually desirable to use about twice that amount. In place of chlorine other non-toxic reagents, which react with chlorite to generate chlorine dioxide, may be used.

The presence of excessive amounts of residual chlorine in the finished water is objectionable and is frequently removed by the usual conventional methods of dechlorination, for instance by treatment with $SO_2$ or sulfite. Activated carbon has been used to assist in the removal of undesirable tastes and odors and when so used also acts as a dechlorinator.

An advantage of our present invention resides in the fact that water may be made potable and free from objectionable tastes and odors without the use of excessive concentrations of residual chlorine, and the subsequent employment of dechlorinating agents. Furthermore, the use of activated carbon may be eliminated or at least the amount used substantially reduced. This effects an additional economy by reducing the chlorine dosage otherwise required to maintain a safe chlorine residual in the distributing system.

For example, the normal dosage used in the treatment of a certain municipal water supply was 1.2 parts per million of chlorine and 3.6 parts per million of activated carbon. We have obtained equally good, if not better results, by treating the same water, to which only 1.2 parts per million of activated carbon had been added, with one part per million of chlorine followed by a treatment with 0.2 part per million of chlorine dioxide, thus materially reducing the activated carbon requirement.

The effectiveness of our improved method of treating water to remove objectionable tastes and odors is demonstrated and our invention further illustrated by the following specific examples of its application.

Example I

There was added to a raw water 0.08 part per million of phenol. The phenol-containing water was then treated with 1.0 P. P. M. of chlorine. The finished water had a disagreeable chlorphenolic taste and odor. By subsequently treating separate samples of the water with chlorine dioxide in proportions of 0.1 and 0.2 P. P. M., respectively, the chlorphenolic taste and odor was almost completely eliminated and where the proportion of chlorine dioxide was increased to 0.4 and 0.6 P. P. M., respectively, all trace of the chlorphenolic taste and odor was eliminated.

Example II

There was added to a raw water 0.01 P. P. M. of phenol and the phenol contaminated water was treated with 1.5 P. P. M. of chlorine. The finished water had a strong chlorphenolic taste and odor. By subsequently treating the water with 0.5 P. P. M. of chlorine dioxide the chlorphenolic taste and odor was completely eliminated.

That the mal-taste and odor of chlorphenol is permanently eliminated by the chlorine dioxide treatment is illustrated by the fact that subsequent treatment of separate samples of the finished water with 0.15 and 0.40 P. P. M., respectively, of chlorine did not effect a redevelopment of the chlorphenolic taste and odor.

Example III

Separate samples of a raw water, to which 0.08 P. P. M. of phenol was added, were treated with 1.5 and 3.0 P. P. M. of chlorine, respectively, and likewise developed a strong chlorphenolic taste and odor. The mal-taste and odor was in each instance completely dispelled by post-treatment with 0.5 P. P. M. of chlorine dioxide.

In the foregoing tests the raw water was contaminated river water and before use was treated with 17 P. P. M. of alum, settled for 2 hours and filtered.

The optimum dosages of chlorine and chlorine dioxide used, in accordance with our invention, will depend to a considerable extent upon the condition of the water, as previously noted. In general, increased concentrations of phenolic compounds or other odoriferous contaminants in the water require an increased amount of chlorine dioxide completely to eliminate the mal-taste and odor.

Example IV

This test was carried on continuously over a period of five days in a plant of a municipal water works treating three million gallons of water per day. The water was pumped at a substantially uniform rate from a source of supply, admixed with alum and chlorine at the intake side of the pump and passed to a 500,000 gallon settling basin. Activated carbon was admixed with the water passing from the settling basin and the admixture was passed to the filters. In normal operation the water was passed from the filter to a clear well and from thence into the distribution system. In accordance with our present invention the water passing from the filters during the test was treated with chlorine dioxide before passing to the clear well.

The proportion of alum added to the water was maintained at 17 P. P. M. throughout the test, with the exception of one day when increased turbidity of the water required that it be increased to 55 P. P. M. The proportion of activated carbon added was maintained at 6 P. P. M., i. e., 50 pounds per million gallons of water, throughout the test.

The concentration of phenol in the water supply was very high throughout the test, laboratory break-point tests indicating that chlorine doses of 15 P. P. M. would, over substantial periods, be required, in the absence of the chlorine dioxide treatment, to avoid objectionable taste and odor of chlorphenol in the finished water.

Throughout the test the chlorine dosage was maintained at about 1.5 P. P. M. and was varied only slightly as the chlorine demand of the water varied. The chlorine dosage was at all times sufficient to disinfect the water and such as to maintain a residual chlorine content of 1.0 P. P. M. in the settling basin and 0.3 P. P. M. leaving the filters.

The chlorine dioxide dosage throughout the test was maintained at a constant value of 0.5 P. P. M. (available chlorine). This concentration of chlorine dioxide was found to be effective in eliminating from the finished water all tastes and odors throughout the test.

In this test the chlorine dioxide was supplied to the water by generating chlorine dioxide in a small flow of water and admixing the resulting water, containing the chlorine dioxide, with the main flow of water between the filters and the clear well. More specifically by means of a metering pump an aqeous sodium chlorite solution at a concentration equivalent to 31 grams per liter of available chlorine, was pumped at the rate of 1.65 gallons per hour, equivalent to .42 pound of available chlorine per hour as sodium chlorite, into the discharge line of a conventional Wallace and Tiernan chlorinator set to deliver 1 lb. of chlorine per million gallons of water, equivalent to 0.12 lb. of chlorine per hour at a pumping rate of 3,000,000 gallons of water per day, into the small flow of water passing therethrough. The proportion of chlorine to chlorite, on the basis of available chlorine, was 1:3.5, the proportion of chlorine being slightly in excess of the theoretical requirement of 1:4, so as to insure complete conversion of the chlorite ions to chlorine dioxide. After injecting the chlorite solution into the chlorine water leaving the chlorinator, the mixture was passed through a small mixing chamber to insure thorough mixing and complete reaction of the chlorine with the chlorite before admixing with the main water flow.

Further tests on the same plant have indicated the desirability of increasing the proportion of chlorine delivered by the chlorinator to an amount in excess of that used in the foregoing example to insure a faster and more complete reaction with the chlorite to form chlorine dioxide. Two pounds of chlorine per million gallons of water has been found to give particularly advantageous results. The use of such excess of chlorine at this point in the process is frequently advantageous for the further reason that it assists in maintaining a desirable chlorine residual in the water passing into the mains.

The proportions of chlorine used in the pre-treatment of the water and of the chlorine dioxide used in the post-treatment may be varied as previously noted to meet particular water requirements. However, we have found that the operation may be carried on continuously with substantially uniform results by maintaining the chlorine dosage sufficient substantially to disinfect the water with no regard for taste and odor formed, and maintaining the chlorine dioxide dosage constant and sufficient to handle the most adverse condition anticipated. The amount of chlorine required will usually vary only within relatively narrow limits and may be readily controlled so as to maintain a prescribed residual chlorine concentration in the settling basin and through the filters, so as to insure disinfection of the water and to keep the settling basin and filters sweet and clean.

Where a plant is operating on the break-point method of chlorination on water from which objectionable tastes and odors are usually satisfactorily eliminated by that method, the treated water frequently has an objectionable taste and odor due to sudden fluctuations in the character of the water, with a resulting shift in the break-point such that adequate control can not be maintained. Under such conditions, the disagreeable tastes and odors may be eliminated by subsequently treating the water with chlorine dioxide as previously described herein. The invention is also applicable where the break-point method of chlorination is used but is not wholly effective in eliminating all objectionable tastes and odors.

The invention has herein been particularly described and illustrated as applied to the treatment of water contaminated by phenol or related compounds which react with chlorine to form chlorphenols or the like. It will be understood, however, that the invention is useful generally in removing from water mal-tastes and odors due to the presence of contaminants of the types previously noted present in the raw water or developed or accentuated therein, as the result of a chlorine treatment of the water.

It will be understood that reference in the claims to phenolic compounds is intended to include not only phenol but also related compounds, for instance, cresols, xylenols, and the like.

During certain seasons surface waters are frequently contaminated by Algae which contribute to objectionable tastes and odors of the water, some of which tastes and odors are accentuated by conventional chlorine treatments. The invention has been found particularly advantageous in freeing the water from mal-tastes and odors due to Algae contamination. For example, the invention has been used with advantage in the treatment of water from the Great Lakes area contaminated by Algae prevalent in that area, including Spirogyra, Synura and Anabaena.

This aspect of the invention is illustrated by the following examples of its application:

*Example V*

The conventional chlorine treatment of an algae-contaminated water from the Great Lakes area resulted in an undesirable odor. In the usual practice, the water was pretreated with chlorine, using 18 pounds of chlorine per million gallons of water, and thereafter treated with activated carbon. By giving the water a pre-treatment, with chlorine and thereafter post-treating the chlorinated water with chlorine dioxide, substantially as described in Example IV, we were able to reduce the amount of chlorine used from 18 to 5 pounds per million gallons of water, to dispense with the activated carbon treatment, and at the same time produce a water free from mal-taste or odor. In this operation the dosage of chlorine dioxide used was about 0.5 part per million.

*Example VI*

In treating a water from the same area running very high in algae, 20 pounds of chlorine per million gallons of water had previously been used. In accordance with our present invention, it was found possible to reduce the amount of chlorine used in the pre-treatment to 7 pounds per million gallons of water by subjecting the water to a post-treatment, as herein described, with about 0.5 parts per million of chlorine dioxide. In our improved operation the water leaving the plant was, with respect to taste and odor, far superior to that previously resulting from the use of 20 pounds of chlorine per million gallons of water, in accordance with conventional practice.

*Example VII*

A water supply pumped from the Penobscot river, contaminated by the presence of algae, sewage, paper mill waste, and decayed vegetation, and containing an unusually large proportion of lignin, was treated with sufficient chlorine prior to coagulation, settling and filtering, in the usual manner, to provide a chlorine residual of 0.2 to 0.3 P. P. M. in the water leaving the filters. The amount of chlorine used varied over the operation from 4 to 6 P. P. M. At this dosage the behaviour of the chlorine residual, as measured by the Laux-Nickol test, indicated that break-point chlorination had been reached. The water leaving the filters had an extremely objectionable taste and odor. By the subsequent treatment of this water with chlorine dioxide, as herein described, using proportions of chlorine dioxide ranging from 0.75 to 1.25 P. P. M., the objectionable taste and odor of the water was substantially removed.

The invention is applicable generally to the elimination of mal-tastes and odors present in the water following a chlorine treatment whether or not the chlorine is supplied in elemental form. Accordingly, the "addition" of chlorine to the water, as recited in the claims, must be understood to include the treatment of water by chlorination whether the chlorine is supplied in elemental form or in combined form as by the conventional addition of a hypochlorite to the water.

In each instance, amounts of residual available chlorine given herein are as determined by the standard Ortho-Tolidine test.

We claim:

1. A method of improving the taste and odor of contaminated water supplies which have been chlorinated with chlorine which comprises contacting the chlorinated water with chlorine dioxide in such manner as to dissolve therein from 0.1 to 10 parts of chlorine dioxide per million parts of water, said amount of chlorine dioxide being at least sufficient to reduce the mal-taste and mal-odor developed in the chlorinated water and thereby produce a potable water substantially free from objectionable taste and odor.

2. A method for improving the taste and odor of contaminated water supplies which comprises adding to the water an amount of chlorine at least sufficient to disinfect the water to render it potable, and thereafter contacting the chlorinated water with chlorine dioxide in such manner as to dissolve therein from about 0.1 to about 10 parts of chlorine dioxide per million parts of water, said amount of chlorine dioxide being at least sufficient to reduce the mal-taste and mal-odor developed in the chlorinated water.

3. In the chlorine treatment of water contaminated by the presence of materials which react with the chlorine to develop and accentuate mal-tastes and mal-odors in the water, the improvement which comprises adding to the water an amount of chlorine at least sufficient to disinfect the water to render it potable, and thereafter contacting the chlorinated water with chlorine dioxide in such manner as to dissolve therein from about 0.1 to about 10 parts of chlorine dioxide per million parts of water, said amount of chlorine dioxide being at least sufficient to reduce the mal-taste and mal-odor developed in the chlorinated water.

4. In the chlorine treatment of water contaminated by the presence of phenolic compounds, the improvement which comprises adding to the water an amount of chlorine at least sufficient to disinfect the water to render it potable, and thereafter contacting the chlorinated water with chlorine dioxide in such manner as to dissolve therein from about 0.1 to about 10 parts of chlorine dioxide per million parts of water, said amount of chlorine dioxide being at least sufficient to reduce the mal-taste and mal-odor developed in the chlorinated water.

5. In the chlorine treatment of water contaminated by the presence of algae, the improvement which comprises adding to the water an amount of chlorine at least sufficient to disinfect the water to render it potable, and thereafter contacting the chlorinated water with chlorine dioxide in such manner as to dissolve therein from about 0.1 to about 10 parts of chlorine dioxide per million parts of water, said amount of chlorine dioxide being at least sufficient to reduce the mal-taste and mal-odor developed in the chlorinated water.

6. In the chlorine treatment of water contaminated by the presence of sewage, the improvement which comprises adding to the water an amount of chlorine at least sufficient to disinfect the water to render it potable, and thereafter contacting the chlorinated water with chlorine dioxide in such manner as to dissolve therein from about 0.1 to about 10 parts of chlorine dioxide per million parts of water, said amount of chlorine dioxide being at least sufficient to reduce the mal-taste and mal-odor developed in the chlorinated water.

7. A method of improving the taste and odor of contaminated water supplies which comprises adding to the water an amount of chlorine at least sufficient to disinfect the water to render it potable, filtering the chlorinated water, and thereafter contacting the chlorinated water with chlorine dioxide in such manner as to dissolve therein from about 0.1 to about 10 parts of chlorine dioxide per million parts of water, said amount of chlorine dioxide being at least sufficient to reduce the mal-taste and mal-odor developed in the chlorinated water.

8. A method of improving the taste and odor of contaminated water supplies which comprises adding to the water an alum coagulant and an amount of chlorine at least sufficient to disinfect the water to render it potable, settling the water, treating the settled water with activated carbon, filtering the thus-treated water, and thereafter contacting the chlorinated water with chlorine dioxide in such manner as to dissolve therein about one-half part of chlorine dioxide per million parts of water.

9. A method of improving the taste and odor of contaminated water supplies which comprises adding to the water an amount of chlorine sufficient to effect superchlorination and render the water potable, and thereafter contacting the chlorinated water with chlorine dioxide in such manner as to dissolve therein from about 0.1 to about 10 parts of chlorine dioxide per million parts of water, said amount of chlorine dioxide being at least sufficient to reduce the mal-taste and mal-odor developed in the chlorinated water.

GEORGE P. VINCENT.
JAMES DOUGLAS MacMAHON.
JOHN F. SYNAN.

REFERENCES CITED

The following references are of record in the file of this patent:

UNITED STATES PATENTS

| Number | Name | Date |
|---|---|---|
| 1,197,640 | Kriegsheim | Sept. 12, 1916 |
| 1,229,305 | Menzies | June 12, 1917 |
| 1,324,118 | Hottinger et al. | Dec. 9, 1919 |
| 1,750,561 | Adler | Mar. 11, 1930 |
| 1,866,524 | Baker | July 12, 1932 |
| 1,943,487 | Ruth | Jan. 16, 1934 |
| 2,272,223 | Pietzsch | Feb. 10, 1942 |

FOREIGN PATENTS

| Number | Country | Date |
|---|---|---|
| 3,529 | Great Britain | 1913 |
| 4,917 | Great Britain | 1898 |
| 19,722 | Great Britain | 1914 |
| 22,048 | Great Britain | 1914 |